United States Patent [19]

Byrd, Jr.

[11] 4,001,996

[45] Jan. 11, 1977

[54] PREFABRICATED INSULATING BLOCKS FOR FURNACE LINING

[75] Inventor: Carlisle O. Byrd, Jr., Houston, Tex.

[73] Assignee: J T Thorpe Company

[22] Filed: Aug. 11, 1975

[21] Appl. No.: 603,391

Related U.S. Application Data

[63] Continuation-in-part of Ser. No. 475,439, June 3, 1974, Pat. No. 3,952,470.

[52] U.S. Cl. .................................... 52/509; 52/506; 52/511; 52/513; 52/597; 428/99; 428/121; 428/126; 428/300

[51] Int. Cl.[2] ...................... E04B 1/80; C04B 43/02

[58] Field of Search ............ 428/99, 100, 121, 126, 428/234, 300; 52/596, 599, 506, 509, 511, 513

[56] References Cited

UNITED STATES PATENTS

| | | | |
|---|---|---|---|
| 739,646 | 8/1903 | Carter | 52/513 |
| 2,120,133 | 6/1938 | Kohler | 52/506 X |
| 2,381,184 | 8/1945 | Ripley | 428/234 |
| 2,390,262 | 12/1945 | Mazer | 52/506 |
| 3,012,923 | 12/1961 | Slayter | 156/62.2 |
| 3,159,235 | 12/1964 | Young et al. | 52/404 |
| 3,553,920 | 1/1971 | Cole, Jr. | 52/506 |
| 3,605,370 | 9/1971 | Prible | 52/513 |
| 3,819,468 | 6/1974 | Sander et al. | 428/99 |
| 3,832,815 | 9/1974 | Balaz et al. | 52/506 X |

*Primary Examiner*—Alfred C. Perham
*Attorney, Agent, or Firm*—Pravel & Wilson

[57] ABSTRACT

Prefabricated insulating blocks are formed from ceramic fiber blankets folded into plural folds, with adjacent layers being needled together to intermingle the fibers of adjacent layers to form composite blocks. The blankets are mounted to attachment channels by support beams, mounted within folds in the blankets, and the folds of the blanket surround and enclose the support beams to protect them from heat and corrosive gases in the furnace.

26 Claims, 6 Drawing Figures

Fig. 4
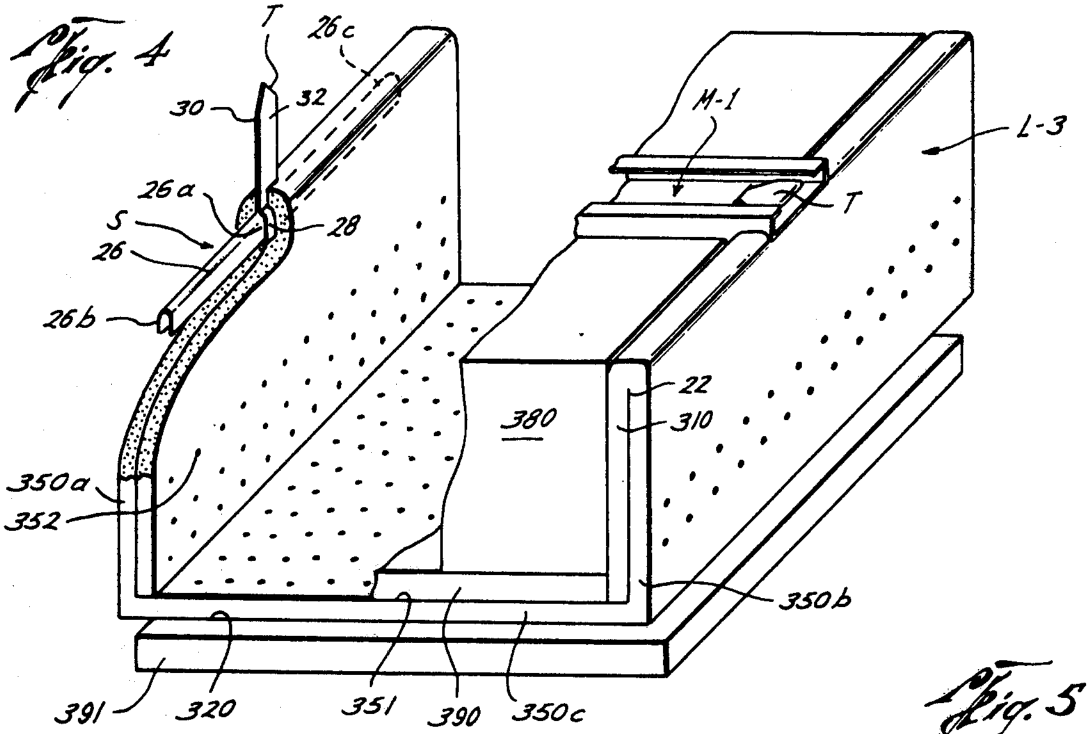
Fig. 5
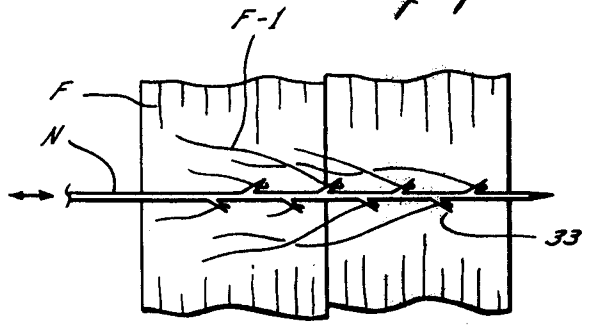
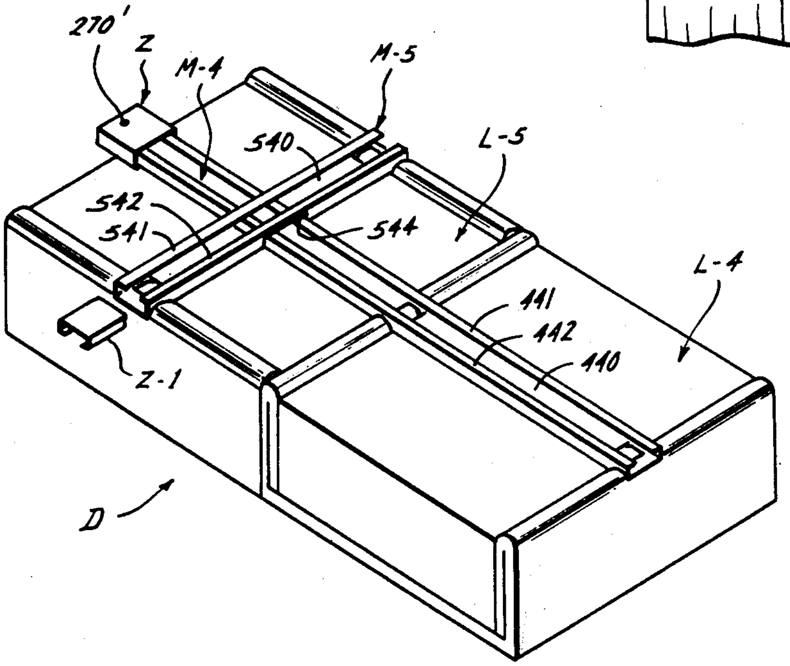
Fig. 6

PREFABRICATED INSULATING BLOCKS FOR FURNACE LINING

CROSS-REFERENCE TO RELATED APPLICATIONS

The present invention is a continuation-in-part of U.S. Pat. application Ser. No. 475,439, filed June 3, 1974, and copending herewith now U.S. Pat. No. 3,952,470.

BACKGROUND OF THE INVENTION

1. Field of Invention

The present invention relates to insulating blocks for lining furnace walls and apparatus for mounting such insulating blocks.

2. Description of Prior Art

It has been known to use refractory bricks or structure to line furnaces, as exemplified in U.S. Pat. Nos. 741,629; 1,701,480; 1,813,790; 2,368,265; 3,302,356; 3,362,689 and 3,630,503.

Ceramic fibers or blankets made from refractory fibrous materials such as chromia-alumina-silica, alumina-silica compositions and zirconia compositions have become desirable as furnace insulation because of their ability to withstand high temperatures. In the past, efforts have been made to attach the fiber or blanket material to the furnace wall using stainless steel attachment structure, but this attachment structure has often been unable to withstand the high temperatures present at the insulation surface and melted or otherwise failed. Further, the ceramic fibers tended to vitrify and shrink during long exposure to high temperatures.

Also, other prior art efforts, such as in U.S. Pat. Nos. 2,341,777; 3,147,832; 3,523,395; 3,687,093; 3,738,217; 3,742,670 and 3,771,467, were made to impale or spear the ceramic blanket on a pin or stud mounted with the furnace wall, with a washer mounted at the end of the stud to hold the blanket in place. However, the blanket tended to sag and tear away from the furnace wall with this structure. Also, the studs served as conduits for heat through the blanket to the furnace wall.

Other similar apparatus, such as in U.S. Pat. No. 3,832,815 were in the form of modules formed from blankets or strips of ceramic fiber material. However, the strips of ceramic material were punctured or pierced by connecting pins when mounted in modules, and the fiber blankets would thus tend to fall away from the pin in the area of the holes where the blankets were pierced by the pin.

Other panels, such as in U.S. Pat. No. 3,605,370 used ceramic wool blankets mounted over refractory blocks, held in place with the blocks by alloy rods in folds of the blankets in spaces between adjacent blocks. With this construction, the blankets were laid flat over the blocks and susceptible to shrinkage. Further, a direct path to the support wires was present between adjacent folds of the blanket for passage of heat and corrosive elements of the furnace atmosphere to the support wires.

SUMMARY OF THE INVENTION

Briefly, the present invention provides a new and improved insulating block for lining a wall of a furnace or like equipment or for forming a wall of a furnace. An insulating blanket is folded into a plurality of folds of adjacent layers or fiber insulating materials, with a support member mounted in a fold of the insulating blanket. The support member is mounted by a suspension arm with an attachment member so that the blanket may be mounted with the wall of the furnace.

The blanket is formed with an inner surface portion exposed along an insulation surface, known as a "hot face" in the art, to the interior of the furnace, with a side surface portion extending outwardly at an end of the inner surface portion to a fold for receiving the support member. An inner end of the blanket inside the side surface portion extends inwardly from the fold to an interior surface of the inner surface portion opposite the "hot face" so that the support member is surrounded within the insulating blanket and protected from heat and corrosive substances in the furnace.

The prefabricated insulating blocks may be installed and removed easily and independently of adjacent insulating blocks lining a wall using attachment structure of the present invention. For independent installation, the attachment member of the insulating block is inserted into and supported by a slide channel mounted with the wall. For independent removal of the insulating block, an access opening of the attachment member is aligned with a fastener aperture of the slide channel thereby allowing access to the fastener holding the slide member and insulating block in the mounted position for ease of installation and removal.

Alternately, plural insulating blankets are mounted and formed into composite blocks, by plural attachment means, mounted transversely with each other, to which the support members of the blankets are attached by the suspension arms, to thereby form composite blocks of a parquet-like construction for lining the furnace wall. In addition, the composite blocks may also be used to form the walls of the furnace itself.

A portion of the fibers in the layers of the blanket adjacent the fold are transversely disposed with respect to the remainder of the fibers and extend into adjacent layers to bind the layers together into an insulating block, binding the fibers into a compact mass and compacting and strengthening the blocks.

It is an object of the present invention to provide a new and improved insulating block for lining a wall of a furnace.

It is a further object of the present invention to provide a new and improved apparatus for installing insulating blocks for lining a wall of a furnace.

BRIEF DESCRIPTION OF THE DRAWINGS

FIG. 4 is an isometric view of an alternate insulating block of the present invention with portions thereof broken away;

FIG. 5 is a schematic cross-sectional representation of adjacent layers of fiber blankets being needled together; and FIG. 6 is an isometric view of a composite insulating block of the present invention formed from plural insulating blankets.

DESCRIPTION OF THE PREFERRED EMBODIMENT

Figure 1:
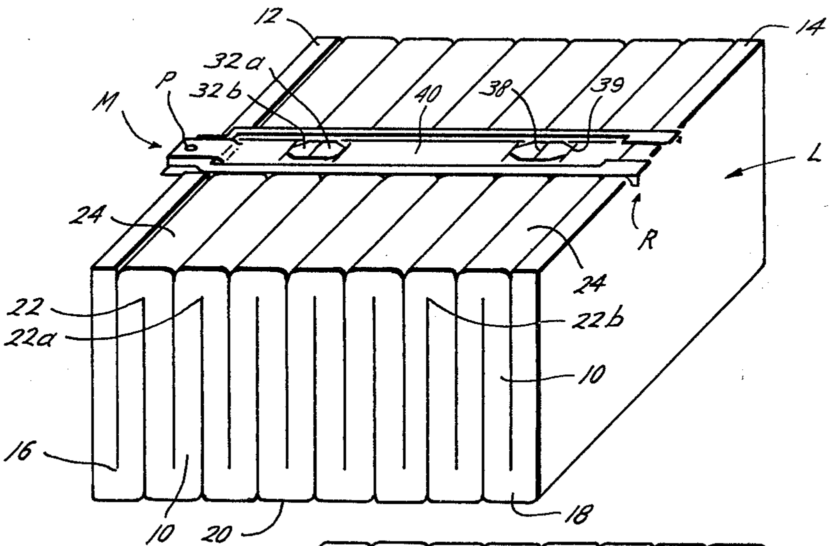
FIG. 1 is an isometric view of an insulating block of the present invention.

In the drawings, the letter B designates generally the insulating block of the present invention for lining a wall (not shown), which may be either a side wall or a roof of a furnace or of some other high temperature equipment such as soaking pits, annealing furnaces, stress relieving units and the like.

The insulating block B is preformed from folding insulating blankets, such as a blanket L, for insulating the furnace, with a support S (FIG. 4) mounted in certain of the folds in the folded blanket and an attachment mounting or channel M for mounting the supports S and the blanket B to the wall.

Considering the blanket L more in detail, such blanket is formed from a suitable commercially available needled ceramic fiber sheet, such as the type known as "Cerablanket~, solt by the Johns-Manville Company, containing alumina-silica fibers or other suitable commercially available refractory fibrous materials. It should be understood that the particular component materials of the ceramic fiber sheet used in the blankets are selected based upon the range of temperatures in the high temperature equipment in which the apparatus A is to be installed.

In a first embodiment (FIG. 1), is a blanket L is folded into adjacent layers 10 mounted sinuously and extending inwardly and outwardly in such a sinuous manner between a first end layer 12 and a second end layer 14 at opposite ends of the attachment mounting or channel M. Adjacent ones of the layers 10 and those layers 10 adjacent the end layers 12 and 14 from inner folds 16 adjacent inner end portions 18 of the blanket L near an insulation surface 20, or "hot face" as termed in the art, exposed to interior conditions in the high temperature equipment. Outer folds 22 are formed between adjacent layers 10 at an opposite end adjacent outer end portions 24 at positions intermediate each of the inner folds 16.

The blanket L is supported at certain of the outer folds 22, designated 22*a* and 22*b* (FIG. 1) by a support beam 26, details of which are set forth in an alternate blanket embodiment (FIG. 4) of the support S mounted in the folds 22. The support beam 26 is formed from a folded bar or a high temperature-resistant metal or alloy or other suitable material, although other shapes of support beams and materials may be used, as set forth in applicants's copending United States application Ser. No. 475,439, now U.S. Pat. No. 3,952,470 which is incorporated herein by reference. The support beam 26 is mounted at a center portion 26*a* (FIG. 4) thereof within a loop 28 formed at a lower end juncture of suspension arms 30 and 32 of a suspending wab or support tab T of the attachment mounting M. The support beam 26 may be welded, such as by spot welding, and the loop 28 and the suspension arms 30 and 32 welded together for additional strength and support, if desired.

Alternately, the suspending wab T may be formed with a single suspension arm. An opening is formed in the center portion 26*a* of the U-shaped support beam 26, and the single suspension arm inserted to extend through such opening. The portion of the suspension arm extending through the opening is then bent to fit against one side of the support beam and secured to the support beam 26 by spot welding the suspension arm thereto.

In the layers of the blanket L, the fibers of material normally extend longitudinally within the layer, as indicated by fibers F (FIG. 5). However, with the present invention, it has been found that a stronger and more compact insulating brick may be formed by "needling" adjacent layers together.

In the needling process, a needle loom, such as a needle felting machine known as a "fiber locker" sold by the James Hunter Machine Company of North Adams, Mass., a plurality of thin metal needles N (FIG. 5), with plural pointed barbs 33 formed thereon are repeatedly forced through adjacent layers of the material to be fused together. As shown schematically in FIG. 5, the barbed needles N pierce perpendicularly into the adjacent layers and catch certain of the fibers F, changing the direction of their orientation from their normal longitudinal extension to a position where a portion F-1 of the fibers in the adjacent layers are transversely disposed to the remainder of the fibers and extend into other adjacent layers to bind the layers together into an insulating block. In this manner, the perpendicular fibers bind the adjacent lamina or layers of the blanket together, compacting and strengthening the blanket. Further, the needling process binds the adjacent fibers together into a tougher, more homogeneous mass.

Needle felting machines and processes are further described in Encyclopedia Britanica, 15th Edition, Volume 18, Page 184 and have in the past been used extensively in making felts, filters and carpets. However, with the present invention, it has been found that this needling technique readily adapts itself into forming stronger, more compact and uniform insulating blocks.

An opening is formed through the outer end portions 24 of the blanket L adjacent the fold 22 receiving the support beam 26 (FIG. 4). The opening so formed extends upwardly through the blanket L from the fold 22 for passage of the suspension arms 30 and 32 through the blanket L. It is to be noted that the support beam 26 is mounted to extend outwardly to ends 26*b* and 26*c* (FIG. 4) from the center portion 26*a* thereof over a substantial portion of the lateral extent of the fold 22 in the blanket L in comparison to the width of the loop 28.

Mounting lugs 30*a* and 32*a*, formed at upper ends of the suspension arms 30 and 32, respectively, of each of the support tabs or suspending wabs T extend upwardly through mounting orifices 38 in a central attachment channel or a stringer channel member 40 of the attachment mounting M. The mounting lugs 30*a* and 32*a* are folded downwardly against the stringer channel member so that the block B may be mounted against the wall. The ends of mounting lugs 30*a* and 32*a* may in addition, if desired, be inserted to extend downwardly through mounting orifices 39 in the attachment mounting M so that sharp ends of the wabs T are enclosed beneath the attachment mounting M. The insertion of the ends of the lugs 30*a* and 32*a* through the mounting orifices 39 protects the hands of installers against points or sharp surfaces at the ends and, in addition, further strengthens the connection of the supports to the attachment mounting M.

Additionally, each of the attachment mounting M has an attachment receptacle R formed at an end thereof and an attachment pin member P formed at an end opposite the attachment receptacle R. The attachment receptacle R of the apparatus receives the attachment pin P of an adjacent block of the apparatus, while the attachment pin P extends outwardly beyond the preformed insulation block B to provide access for welding in order to mount the block to the furnace wall. After such mounting, the pin P is fitted into an attachment receptacle R of another adjacent block B.

A starting anchor having an attachment pin P mounted therewith is used at a starting location to begin installing operations. Further details concerning the attachment pin P, attachment receptacle R, starting anchor K and the installation of insulation blocks with a furnace wall using the attachment mounting M are set forth in detail in applicant's copending U.S. patent application Ser. No. 475,439 now U.S. Pat. No. 3,952,470, which is incorporated herein by reference for such purpose. Also, structural details of the attachment mounting M are also set forth in detail in such application and incorporated herein by reference for such purpose.

In addition to the first embodiment set forth above, the invention may take the form of several other embodiments. In such embodiments, like structure performing like functions bears like reference numerals.

Figure 2:
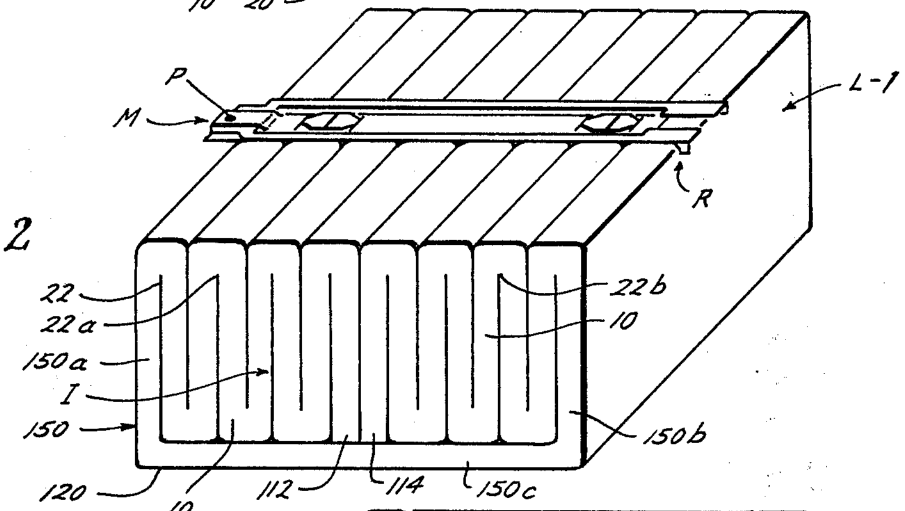
FIG. 2 is an isometric view of an alternative insulating block of the present invention.

In a second embodiment (FIG. 2) a blanket L-1, formed from a single piece of suitable insulating material of the type set forth above, is folded so that adjacent layers 10 are formed which extend outwardly in a sinuous fashion from both a first end portion 112 and a second end portion 114 of the blanket L-1. The blanket L-1 is preferably mounted to the furnace wall with an attachment mounting M and supports S in a like manner to the blanket L as set forth above. The end layers 112 and 144 are preferably located at the center of the attachment mounting M.

The adjacent layers 10 and end portions 112 and 114 of the blanket L-1 form an inner portion I of the blanket L-1, which is enclosed by enclosing layer 150. The enclosing layer 150 includes side surface portions 150*a* and 150*b* extending inwardly from folds 22 formed by the side surface portions 150*a* and 150*b* and adjacent layers 10 located at the ends of the attachment mounting M. The side surface portions 150*a* and 150*b* extend to a continuous inner surface portion 150*c* of the enclosing layer 150. Thus, the blanket L-1 is a continuous folded member extending from the end portion 112 through layers 10, side surface portion 150*a*, inner surface portion 150*c*, side surface portion 150*b*, and layers 10 to end layer 114. The exterior surface 120 of the inner surface portion 150*c*, or "hot face" as termed in the art, is exposed to interior conditions in the high temperature equipment.

To obtain a stronger, more rigid, and more compact insulating block B, several or all of the adjacent layers 10 and 150 of the blanket L-1 may be "needled" together in the manner set forth above.

The blanket L-1, formed by being folded in the manner set forth above, contains no through passages or avenues for hot gases to pass from the "hot face" to the cold face adjacent the attachment mounting M. Additionally, since the supports S support the blanket L-1 at outer folds 22*a* and 22*b* in the manner as set forth for the first embodiment (FIG. 1), the supports S are completely enclosed so that there is no path for the passage of heat and corrosive elements of the furnace atmosphere to the supports S.

In a third embodiment, a blanket L-2 (FIG. 3) is formed by folding a single piece of suitable insulating material in a like manner to the blanket L-1 (FIG. 2) except that the blanket L-2 is folded so that inner layers 10 and end layers 212 and 214 are folded to be shorter in length in their extension inwardly from the attachment mounting M than a side surface portion 250*a* and a side surface portion 250*b*. Thus, the side surface portions 250*a* and 250*b* are longer than the inner layers 10 and end layers 212 and 214 comprising the inner portion I. The outer end portions 253 adjacent the folds 22 formed by the side surface portions 250*a* and 250*b* and adjacent layers 10 form two side surfaces 255 of an enclosure or pocket beneath the attachment mounting M. This enclosure extends above a surface 254 formed by the outer end portions 224 of adjacent layers 10 to the attachment mounting M, and is adapted to receive an insulating block or blanket 260. The insulating block 260 may be made of the same material as the blanket L-2; however, if desired for economic reasons, a lower temperature rated material of lower cost, such as mineral wool or fiberglass, may be used at this comparatively lower temperature interior location without decreasing the capability of the insulating block B to withstand high temperatures.

It should be understood that the depth of the enclosure and thus the thickness of the insulating block 260 can be varied as desired since the length of side surfaces 255 of the enclosure can be varied by adjusting the relative length of the side surface portions 250*a* and 250*b* and the adjacent layers 10.

The blanket L-2 is supported by a support beam 26 (FIG. 4) of the support S as described for the blankets L and L-1 except that the support beam 26 is mounted in the folds 22 adjacent the outer end portions 253. Further, to obtain a stronger, more rigid, and more compact construction, several adjacent layers 10, end layers 212 and 214 and layers 250*a* and 250*b* may be "needled" together in the manner described above.

Figure 3:
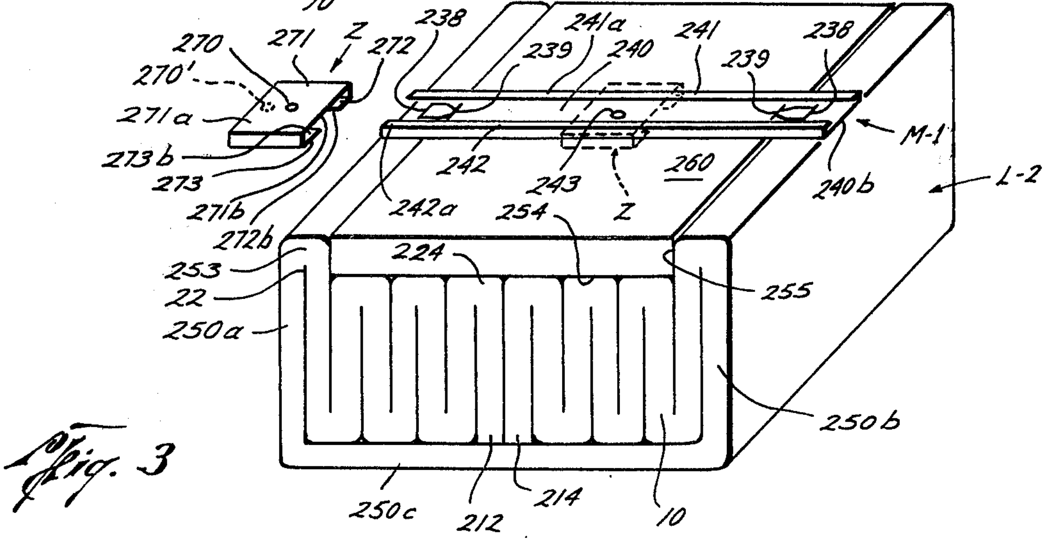
FIG. 3 is a partially exploded isometric view of an alternative insulating block of the present invention.

As an alternative to the attachment mounting M for mounting the insulating block B to the wall of the furnace, an attachment mounting or channel M-1 (FIG. 3) may be used. A slide channel Z, mounted to the wall of the furnace in a manner to be set forth below, is adapted to mount with attachment mounting M-1 for mounting the insulating block B to the wall of the furnace. An exploded isometric view of the slide channel Z is shown in FIG. 3 in order to show the details of its structure. Slide channel Z is also shown in phantom in an assembled position with respect to the attachment mounting M-1, in order to illustrate how the structure of attachment mounting M-1 and slide channel Z interconnect.

The slide channel Z, shown by the exploded isometric view in FIG. 3, is preferably formed from a C-shaped stringer channel member of suitable metal, although other materials may be used if desired. The slide channel Z has a central channel plate 271 formed extending between L-shaped outer supporting rails 272 and 273. The supporting rails 272 and 273 extend outwardly with respect to the central channel plate 271 a sufficient distance to permit insertion of the attachment mounting M-1 inside the slide channel Z.

In addition, a fastener aperture 270 of suitable size, one-fourth inch diameter for example, is formed in the center of the central channel plate 271 of the slide channel Z. The slide channel Z is secured to the wall of the furnace by welding, screwing, or other suitable fastening techniques through the fastener aperture 270. Alternately, a fastener aperture 270, shown in phantom, may be formed in an offset position from the center of the central channel 271 toward an end 271*a* thereof for an alternate mounting method to be more fully described below.

The attachment mounting or channel M-1 is formed from a C-shaped or U-shaped stringer channel member of suitable metal, although other materials may be used if desired, of a size permitting the attachment mounting M-1 to be inserted into the slide channel Z for mounting the insulating block B to the wall. Preferably, the ends of the attachment mounting do not extend beyond the edges of the insulating blanket in order to permit the blocks to be mounted adjacent one another as closely as possible.

The attachment mounting M-1 has a central attachment plate 240 mounted between L-shaped or I-shaped outer rails 241 and 242. The rails 241 and 242 extend outwardly with respect to the central attachment plate 240 a sufficient distance to permit the insertion of the attachment mounting M-1 inside the slide channel Z. A mounting orifice 238 is formed in the central attachment plate 240 through which mounting lugs 30*a* and 32*a* of the support S extend. The mounting lugs 30*a* and 32*a* may, in addition, be inserted to extend downwardly through mounting orifices 239 in order that the sharp ends of the wabs T are enclosed beneath the attachment mounting M-1. As with the orifices 39, the insertion of the lugs 30*a* and 32*a* through the mounting orifices 239 protects the hands of installers against the sharp ends and, in addition, further strengthens the mount of the supports S to the attachment mounting M-1. The part of the mounting lugs 30*a* and 32*a* remaining above the attachment mounting M-1 after insertion through the mounting orifices 238 and 239 in the manner set forth above are prevented from protruding above the upper surfaces 241*a* and 242*a* of the mounting rails 241 and 242, respectively.

In addition to the mounting orifices 238 and 239, the central attachment plate 240 also has an access opening 243 of a suitable size, for example ¾ inch diameter, formed in its center, for reasons to be set forth below.

In installing the insulating block B as a lining for a wall of a furnace, an outer surface 271*a* of the central channel plate 271 of the slide channel Z is positioned substantially flush with the wall of the furnace approximately 5 inches away from the corner of the wall, an adjacent insulating block B, or other final installed position. The slide channel Z is secured to the wall by welding, screwing, or other suitable fastening technique through the fastener aperture 270. The attachment mounting M-1 is then inserted into the slide channel Z so that an inner surface 272*b* and an inner surface 273*b* of the supporting rails 272 and 273, respectively, of the slide channel Z contact the outer surface 240*b* of the central attachment plate 240 of attachment mounting M-1 adjacent the blanket L-2. The attachment mounting M-1 is then slid or otherwise moved inwardly with respect to the slide channel Z into a mounting position shown in phantom in FIG. 3 so that the access opening 243 in the central attachment plate 240 of the attachment mounting M-1 is aligned with the smaller diameter fastener aperture 270 of the central channel plate 271 of slide channel Z.

The aligned fastener aperture 270 and access opening 243 serve two purposes. First, if an insulating block B fails and needs to be replaced or repaired, the larger access opening 243 gives direct access to the fastener in the fastener aperture 270.

Secondly, alignment of fastener aperture 270 and opening 243 permits ease of installation of the last insulating block of the pattern of insulating blocks B at a corner or other relatively inaccessible location on the wall of a furnace. For instance, a hole is drilled in the appropriate place in the wall of the furnace. The attachment mounting M-1 is then inserted into the slide channel Z before the slide channel Z is mounted to the walll. Next a small opening is formed through the mass of fiber in the blanket L; the insulating block B, with the slide channel Z in the assembled position shown in phantom, is put into position beneath the drilled hole; and an attachment screw, pin, or other suitable fastening device is affixed in the fastener aperture 270 through the access opening 243 and the opening formed through the fiber mass.

In a fourth embodiment (FIG. 4), a blanker L-3, formed from a single piece of suitable ceramic fiber insulating material, is first folded to form an inner surface portion 350*c* which is exposed along an interior insulation surface 320, or "hot face", to interior conditions in the high temperature equipment. Side surface portions 350*a* and 350*b* of the blanket L-3 extend outwardly from each end of the inner surface portion 350*c* toward the wall of the furnace to a fold 22 formed therein for receiving a support S in the manner previously set forth. Inner wall member portions 310 adjacent the side surface portions 350*b* and 350*c*, respectively, extend inwardly from the fold 22 to an interior surface 351 of the inner surface portion 350*c* opposite the insulation surface 320 thereof.

The inner wall member portions 310 and the side surface portions 350*a* and 350*b*, respectively, are preferably needled together in the manner set forth above. This needling enables the blanket to hold itself to the support S and gives it sufficient strength to support a load. The needled blanket L-3 may be mounted to the furnace wall with a slide channel Z, attachment mounting M-1, and supports S in a like manner to the blanket L-2 set forth above.

It should be noted that a blanket L-3 folded over the supports S in the manner just described completely encloses the supports S so that there is no direct path for furnace gases or heat to pass from the "hot face" to the supports S.

A large mass of bulk ceramic fiber 380, or other lower temperature rated insulation refractory material of lower cost, is placed in an enclosure or pocket formed by surfaces 352 of the inner wall member portions 310, the interior surface 351 of the inner surface portion 350*c*, and the attachment mounting M-1 which attaches the insulating block B to the wall of a furnace. This bulk material may be contained temporarily in a plastic or fiber container which will burn and be consumed when the insulating block is exposed to the heat of the furnace.

The mass of bulk ceramic fibers 380 which is compressed and retained in the plastic or fiber container also may be needled to more uniformly distribute, reorient, and tie together the fibers so that when the container is removed or burned away the fibers will retain the shape of the container. However, the mass of fibers 380 need not be needled together in order to construct the block B.

In addition, the inner surface portion 350*c* and the side surface portions 350*b* and 350*a* of the blanket L-3 may be needled to the mass of bulk ceramic fibers 380. This will prevent the fibers in the center of the insulating block B from falling out if the inner surface portion 350*c* of the blanket L-3 fails. It should be noted that the needled ceramic fiber insulating blanket L-3 can support many times its own weight when the blanket is placed in tension by material placed in the above described enclosure formed by the blanket L-3.

It should also be noted that the use of bulk fibers supported by the folded blanket L-3 substantially lowers the cost of the insulating block B without impairing the ability of the insulating block B to withstand high temperatures.

Further, a ceramic fiber board 390, or alternatively a layer of relatively dense material such as 30 lb. fused silica foam, may be placed in the bottom of the enclosure formed by the folded blanket L-3 prior to insertion therein of the mass of bulk fibers 380. The ceramic fiber board 390 gives structural strength to the enclosure formed by the blanket L-3, thereby preventing the insulating block B from sagging.

In addition, an insulating mat 391 having a higher temperature capability than the blanket L-3 may be mounted on the exterior surface 320 of the inner surface portion **350*c* between the outer surfaces of the side surface portions 350*a* and 350*b*. The insulating mat 391 is bound to the inner surface portion 350*c* by needling the inner surface portion 350*c* to the insulating mat 391**. Thus, it is possible to use different strata of materials for the block B to provide the lowest possible conductivity and cost commensurate with the conditions to which the block B will be exposed.

Further, if desired, the insulating mat 391 may be mounted in an offset position with respect to the inner surface portion **350*c* of the blanket L-3. The insulating mat 391 so mounted overlaps the gap between adjacent insulating blocks B when plural insulating blocks B are mounted adjacent each other for lining the furnace wall. This overlapping of the gap between adjacent insulating blocks B by the insulating mat 391** prevents the flow of hot gases from the hot face to the cold face in the space between contacting surfaces of adjacent blocks B.

Plural insulating blocks B of the types described above may be mounted and formed into composite blocks D (FIG. 6) by means of two attachment mountings or channels M-4 and M-5 mounted transversely with each other to which supports S of the blankets are attached by the suspension arms 30 and 32 (FIG. 4), thereby forming a parquet-like construction either for lining furnace walls or for building furnace walls, in a manner to be set forth, without the use of other supporting structure.

An attachment mounting M-4 is attached to a first insulating blanket L-4, shown in simplified form since it may be formed in any of the alternate manners described above. The attachment mounting M-4 is formed in a like manner to the attachment mounting M-1 set forth above (FIG. 3) except that the attachment mounting M-4 (FIG. 6) is of sufficient length to extend beyond blanket L-4 across a blanket L-5 formed, in a like manner to blanket L-4, using any of the alternate manners above.

A second, shorter attachment mounting M-5 is attached to the second insulating blanket L-5. Attachment mounting M-5 extends across the blanket L-5 and is formed in a like manner to attachment mounting M-4 except that it is relatively larger in dimensions so that the mounting M-4 may be inserted within mounting M-5 in a like manner to the insertion of attachment mounting M-1 into slide channel Z. Hence, the mounting M-5 has supporting rails 541 and 542 which are wider in extent outwardly from a central attachment plate 540 than the extent of supporting rails 441 and 442 outwardly from a central attachment plate 440 of attachment mounting M-4, to allow a slot 544 to be cut in the supporting rails 541 and 542 of attachment mounting M-5 for insertion and passage of attachment mounting M-4 therethrough.

The smaller attachment mounting M-4 is inserted through the slot 544 in the larger attachment mounting M-5 until blankets L-4 and L-5 abut. The transversely mounted attachment mountings M-4 and M-5 are then spot welded to each other or fastened together in any other suitable manner. It should be noted that the folds of insulating blanket L-4 are transversely mounted with respect to the folds of insulating blanket L-5. This transverse mounting provides further support for the composite insulating block D in that the pressure exerted by the side surface portions of adjacent blankets will prevent a blanket L-4 or L-5 from dropping out of its mounted position should the blanket fail in any manner. This additional support is especially helpful whenever blankets L-4 and L-5 are formed in a like manner to the blanket L-3 with an enclosure for a mass of bulk fiber 380. Hence, the side surface portions of an adjacent transversely mounted blanket provide the remaining walls for completely enclosing the mass 380, thereby adding further support for holding the mass of bulk fibers 380 in place should the blanket L-4 or L-5 fail.

The composite block D formed by the transversely mounted blocks formed from blankets L-4 and L-5 is mounted to the furnace wall by means of a slide channel Z formed in the same manner as set forth above. The slide channel Z may be cut from the same C-shaped stringer channel member as attaching mounting M-5. The slide channel Z is inserted about the smaller attachment mounting M-4 as previously described (FIG. 3). Next the insulating block D is positioned so that approximately one-half of the slide channel Z extends onto the end of the attachment mounting M-4 and is spot-welded or fastened in any other suitable manner thereto. The other end of the slide channel Z is secured to the furnace wall adjacent a corner of the furnace by spot welding, screwing, or other suitable fastening device through the fastener aperture 270 shown in phantom in the part of the slide channel Z extending beyond the end of the attachment mounting M-4. Alternatively, the other end of the slide member Z functions as a socket into which the attachment mounting M-4 of a second composite block D is inserted and fastened thereto so that a parquet-like construction of composite blocks D lines the furnace wall.

To form a parquet-like construction of composite blocks D for building the furnace walls of a small furnace without the necessity of other supporting structure, a slide channel Z cut from the same C-shaped stringer channel member as attachment mounting M-5 is partially inserted about the smaller attachment mounting M-4 of a first composite block D and is spot-welded or fastened in any suitable manner thereto. The remaining part of the slide channel Z is inserted about the smaller attachment mounting M-4 of a second composite block D and fastened thereto in a like manner to form two adjacent blocks in a line or row in the direction of the mounting M-4.

To mount adjacent rows or lines of composite blocks together in the direction of the mounting M-5 when forming a wall or lining, slide channels Z-1 of a C-shaped stringer channel member of like dimensions as attachment mounting M-4, are partially inserted into the larger attachment mountings M-5 of the first and second composite block D, respectively, and spot-welded or fastened in any suitable manner thereto. A third and fourth composite block D are mounted adjacent the first and second composite blocks D by inserting the remaining part of the slide channels Z-1 into the larger attachment mountings M-5 of the third and fourth composite blocks D, respectively. Thus, a parquet-like construction of four or more composite blocks may be formed which is suitable for use either as a wall itself or a small furnace or as a lining.

Although the present invention is described in the preferred embodiment as insulating a furnace or forming a furnace wall, it should be understood that the apparatus of the present invention is also suitable to insulate or form cryogenic, or low temperature equipment, as well.

The foregoing disclosure and description of the invention are illustrative and explanatory thereof, and various changes in the size, shape, and materials as well as in the details of the illustrated construction may be made without departing from the spirit of the invention.

I claim:

1. An insulating block for lining a wall of a furnace and like equipment, comprising:

a. an insulating blanket folded into a plurality of folds of adjacent layers of fiber insulating material;

b. a portion of said fibers in said layers of said blanket adjacent said folds being transversely disposed to the remainder of said fibers and extending into other adjacent layers to bind the layers together into an insulating block; and c. means for attaching said insulating blanket to the wall of the furnace, said means for attaching including a support member mounted in a fold of said insulating blanket.

2. The structure of claim 1, wherein said means for attaching further comprises:

a. a suspension arm having said support member mounted therewith, said suspension arm having mounting means therewith extending through said insulating blanket; and b. An attachment member mounted with said mounting means of said suspension arm, said attachment member further having means therewith for attachment to the wall of the furnace wherein said blanket forms a lining for the wall of the furnace.

3. The structure of claim 2, further including:

an insulating block mounted between said blanket and said attachment member.

4. The structure of claim 2, wherein said blanket comprises an inner surface portion opposite said folds for mounting said support member, and further including:

an insulating mat of fibers having a portion of said fibers transversely disposed to the remainder of said fibers and extending into said inner surface portion of said blanket to mount said mat with said blanket.

5. The structure of claim 4, wherein:

said insulating mat is mounted in an offset position with respect to said inner surface portion of said blanket to overlap gaps between adjacent blocks when plural insulating blocks are mounted adjacent each other.

6. The structure of claim 2, wherein said blanket comprises:

a. an inner surface portion exposed along an insulation surface to the interior of the furnace;

b. a side surface portion extending outwardly from said inner surface portion at an end thereof to a fold formed therein for receiving said support member; and c. an inner wall member portion mounted inside said side surface portion extending inwardly from said fold formed in said side surface portion to an interior surface of said inner surface portion opposite said thermal surface thereof, wherein said blanket surrounds said support member to protect said support member from heat and corrosive substances.

7. The structure of claim 6, wherein said blanket comprises:

a. a side surface portion extending outwardly from said inner surface portion at each end to a fold formed therein for receiving said support member; and b. an inner wall member portion mounted inside each of said side surface portions extending inwardly from said fold formed in said side surface portions to an interior surface of said inner surface portions opposite said insulation surface thereof.

8. The structure of claim 7, further including:

an insulating mat mounted on said insulation surface of said inner surface portion between said inner end portions.

9. The structure of claim 8, wherein said insulating mat is formed from fibers and wherein:

a portion of said fibers in said insulating mat being transversely disposed to the remainder of said fibers in said mat and extending into said inner surface portion of said blanket to bind said insulating mat therewith.

10. The structure of claim 1, wherein:

a portion of said fibers in each of said layers of said blanket being transversely disposed to the remainder of said fibers and extending into other adjacent layers to bind the layers together into an insulating block.

11. An insulating block for lining a wall of a furnace and like equipment, comprising:

a. an insulating blanket folded into a plurality of folds of adjacent layers of fiber insulating material, said blanket comprising:

1. an inner surface portion exposed along an insulation surface to the interior of the furnace;
2. a side surface portion extending outwardly from said inner surface portion at an end thereof to a fold formed therein for receiving a support member; and
3. an inner wall member portion mounted inside said side surface portion extending inwardly from said fold formed in said side surface portion to an interior surface of said inner surface portion opposite said thermal surface thereof, wherein said blanket surrounds said support member to protect said support member from heat and corrosive substances;

b. a support member mounted in a fold in said insulating blanket;

c. a suspension arm having said support member mounted therewith, said suspension arm having mounting means therewith extending through said insulating blanket; and d. an attachment member mounted with said mounting means of said suspension arm, said attachment member further having means therewith for attachment to the wall of the furnace wherein said blanket forms a lining for the wall of the furnace.

12. A composite insulating block for lining a wall of a furnace and like equipment, comprising:

a. a first insulating blanket folded into a plurality of folds of adjacent layers of fiber insulating material;

b. a first support member mounted in a fold in said first insulating blanket;

c. a first suspension arm having said support member mounted therewith, said suspension arms having mounting means therewith extending through said first insulating blanket;

d. a first attachment member mounting with said first mounting means of said first suspension arm, said first attachment member further having means therewith for attachment to the wall of the furnace;

e. A second insulating blanket folded into a plurality of folds of adjacent layers of fiber insulating material;

f. A second support member mounted in a fold in said second insulating blanket;

g. a second suspension arm having said support member mounted therewith, said suspension arms having mounting means therewith extending through said second insulating blanket; and h. a second attachment member mounted with said second mounting means of second suspension arm, said second attachment member further extending across said first insulation blanket, and being transversely mounted with said first attachment member thereby to form a composite insulating block of plural folded insulating blankets having cross support.

13. The structure in claim 12, wherein:

said plurality of folds of said second insulating blanket are transversely mounted with respect to said folds of said first insulating blanket thereby providing additional support for said composite insulating block.

14. The structure of claim 12, wherein said means for attachment comprises:

slide channel member having insert means for insertion and support of said first attachment member, said slide channel member having a fastener aperture for receiving a fastening means to mount said composite block to the outer wall of the furnace.

15. A composite insulating block having an inner insulation surface for forming a wall of a furnace and like equipment, comprising:

a. a first insulating blanket folded into a plurality of folds of adjacent layers of fiber insulating material;

b. a first support member mounted in a fold in said first insulating blanket;

c. a first suspension arm having said support member mounted therewith, said suspension arms having mounting means therewith extending through said first insulating blanket;

d. a first attachment member mounting with said first mounting means of said first suspension arm;

e. a second insulating blanket folded into a plurality of folds of adjacent layers of fiber insulating material;

f. a second support member mounted in a fold in said second insulating blanket;

g. a second suspension arm having said support member mounted therewith, said suspension arms having mounting means therewith extending through said second insulating blanket; and h. a second attachment member mounted with said second mounting means of second suspension arm, said second attachment member further extending across said first insulation blanket, and being transversely mounted with said first attachment member thereby to form a composite insulating block of plural folded insulating blankets having cross support.

16. The structure of claim 15, further including:

first sliding means for mounting said first attachment member with a first attachment member of a second composite block.

17. The structure of claim 16, wherein said composite insulating block further includes:

second sliding means for mounting said second attachment member with a second attachment member of a third composite block.

18. The structure of claim 17, wherein:

a. said first sliding means comprises a first slide channel member, said first slide channel member having first insert means for insertion about and support of said first attachment member; and b. said second sliding means comprises a second slide channel member, said slide channel member having second insert means for insertion within and support of said second attachment member.

19. The structure of claim 15, wherein:

said plurality of folds of said second insulating blanket are transversely mounted with respect to said folds of said first insulating blanket thereby providing additional support for said composite insulating block.

20. An insulating block for lining a wall of a furnace and like equipment, comprising:

a. an insulating blanket folded into a plurality of folds of adjacent layers of fiber insulating material;

b. a support member mounted in a fold in said insulating blanket;

c. a suspension arm having said support member mounted therewith, said suspension arm having mounting means therewith extending through said insulating blanket;

d. an attachment member mounted with said mounting means of said suspension arm, said attachment member having a plurality of mounting orifices formed therein, said attachment member further having means therewith for attachment to the wall of the furnace wherein said blanket forms a lining for the wall of the furnace; and e. said suspension arm mounting means extending through one of said mounting orifices to the side of said attachment member opposite said insulating blanket and further extending through another of said mounting orifices to the side of said attachment member adjacent said insulating blanket, thereby mounting said suspension arm mounting means flush with said attachment member and enclosing the ends of said mounting means beneath said attachment member.

21. An insulating block for lining a wall of a furnace and like equipment which is easily and independently installed and removed, comprising:

a. an insulating blanket folded into a plurality of folds of adjacent layers of fiber insulating material;

b. a support member mounted in a fold in said insulating blanket;

c. a suspension arm having said support member mounted therewith, said suspension arm having mounting means therewith extending through said insulating blanket;

d. an attachment member mounted with said mounting means of said suspension arm, said attachment member further having an access opening formed therein;

e. slide channel member having insert means for insertion and support of said attachment member, said slide channel member further having a fastener aperture for receiving a fastening means to mount said insulating block to the furnace wall; and f. said attachment member being movable with respect to said slide channel member to a mounting position wherein said access opening and said fastener aperture are aligned so that access to the fastener is provided for removing, replacing or repairing said mounted insulating block independently of adjacent mounted insulating blocks lining the wall of the furnace.

22. The structure of claim 1, wherein said blanket comprises:

an inner surface portion opposite said fold for mounting said support member, said inner surface portion having fibers transversely disposed to the direction of heat flow whereby the insulating capability of said insulating block is increased.

23. The structure of claim 22, wherein said inner surface portion comprises:

a plurality of adjacent inner end portions connecting alternate adjacent layers of said blanket at inner ends thereof to form inner folds wherein said inner end portions have fibers therein transversely disposed to the fibers in said adjacent layers and to the direction of heat flow whereby the insulating capability of said insulating block is increased.

24. An insulating block for lining a wall of a furnace and like equipment, comprising:

a. an insulating blanket folded into a plurality of adjacent layers of fiber insulating material and having folds formed between said adjacent layers alternately at outer and inner ends thereof, respectively;

b. means for attaching said insulating blanket to the wall of the furnace, said means for attaching including a support member mounted in at least one of said outer folds; and c. said insulating blanket further including inner end portions connecting adjacent layers of said blanket at inner ends thereof to form said inner folds, said inner end portions having fibers transversely disposed to the direction of the heat flow towards the furnace wall to increase the insulating capacity of said insulating block.

25. The structure of claim 24, wherein:

a portion of said fibers in said layers of said blanket adjacent said folds being transversely disposed to the remainder to said fibers and extending into other adjacent layers to bind the layers together into an insulating block.

26. The structure of claim 24, wherein said means for attaching further comprises:

a. A suspension arm having said support member mounted therewith, said suspension arm having mounting means therewith extending through said insulating blanket; and b. an attachment member mounted with said mounting means of said suspension arm, said attachment member further having means therewith for attachment to the wall of the furnace wherein said blanket forms a lining for the wall of the furnace.

* * * * *

UNITED STATES PATENT AND TRADEMARK OFFICE

CERTIFICATE OF CORRECTION

PATENT NO. : 4,001,996

DATED : January 11, 1977

INVENTOR(S) : Carlisle O. Byrd, Jr.

It is certified that error appears in the above-identified patent and that said Letters Patent are hereby corrected as shown below:

olumn 3, line 19, "solt" should read --sold--.

olumn 3, line 27, "is" should be deleted.

olumn 3, line 33, "from" should read --form--.

olumn 4, line 64, "mounting" should read --mountings--.

olumn 5, line 33, "144" should read --114--.

olumn 8, line 9, "walll" should read --wall--.

olumn 8, line 17, "blanker" should read --blanket--.

olumn 11, line 16, "or" first occurence should read -- of --, olumn 16, line 25 (Claim 25), "to" should read --of--.

Signed and Sealed this

*Twenty-second* Day of *November 1977*

[SEAL]

*Attest:*

RUTH C. MASON
*Attesting Officer*

LUTRELLE F. PARKER
*Acting Commissioner of Patents and Trademarks*